July 6, 1965 E. S. CARTER 3,192,937
RETRACTIBLE VEHICLE CANOPY
Filed July 11, 1963 3 Sheets-Sheet 2
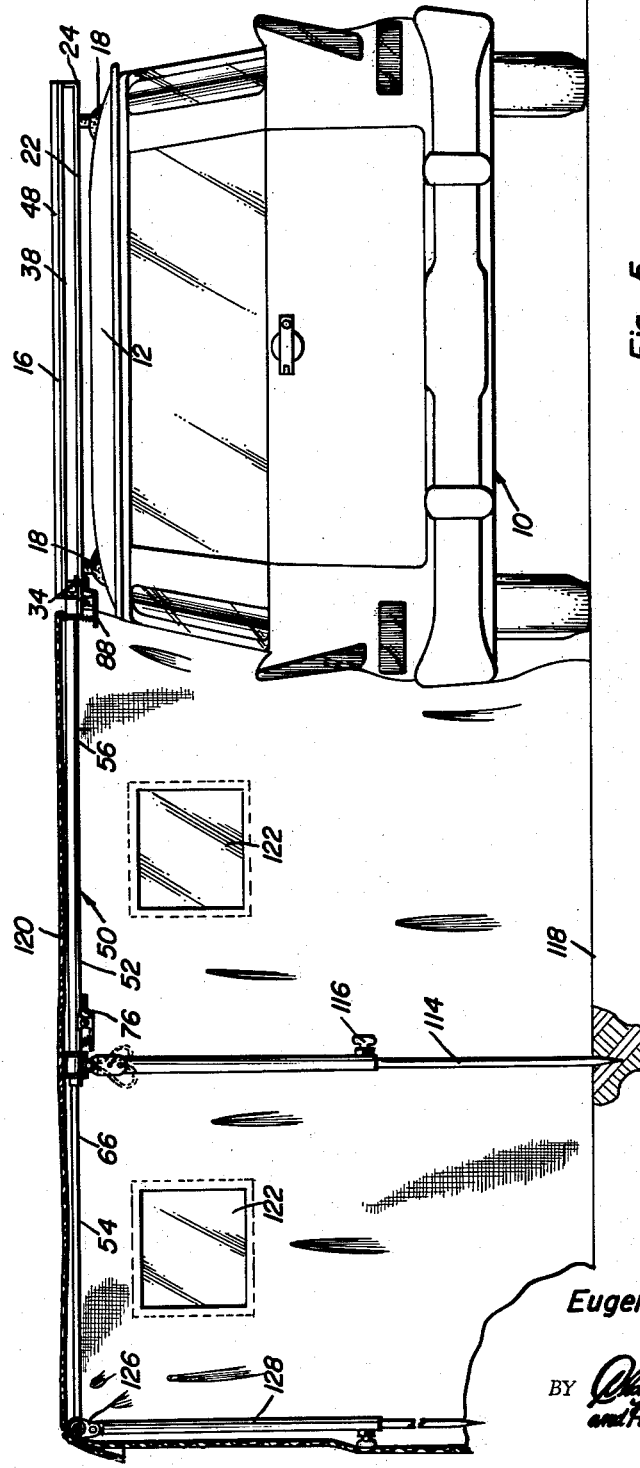
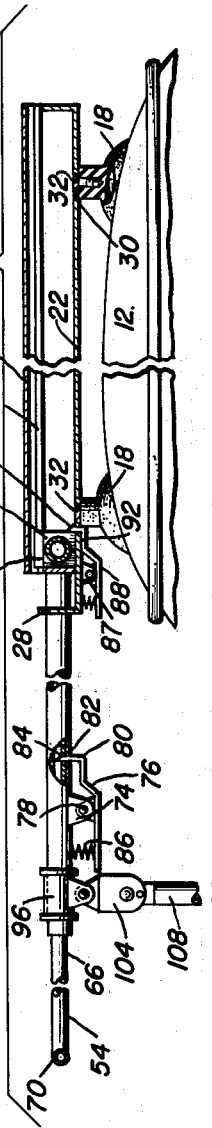
Eugene S. Carter
INVENTOR.

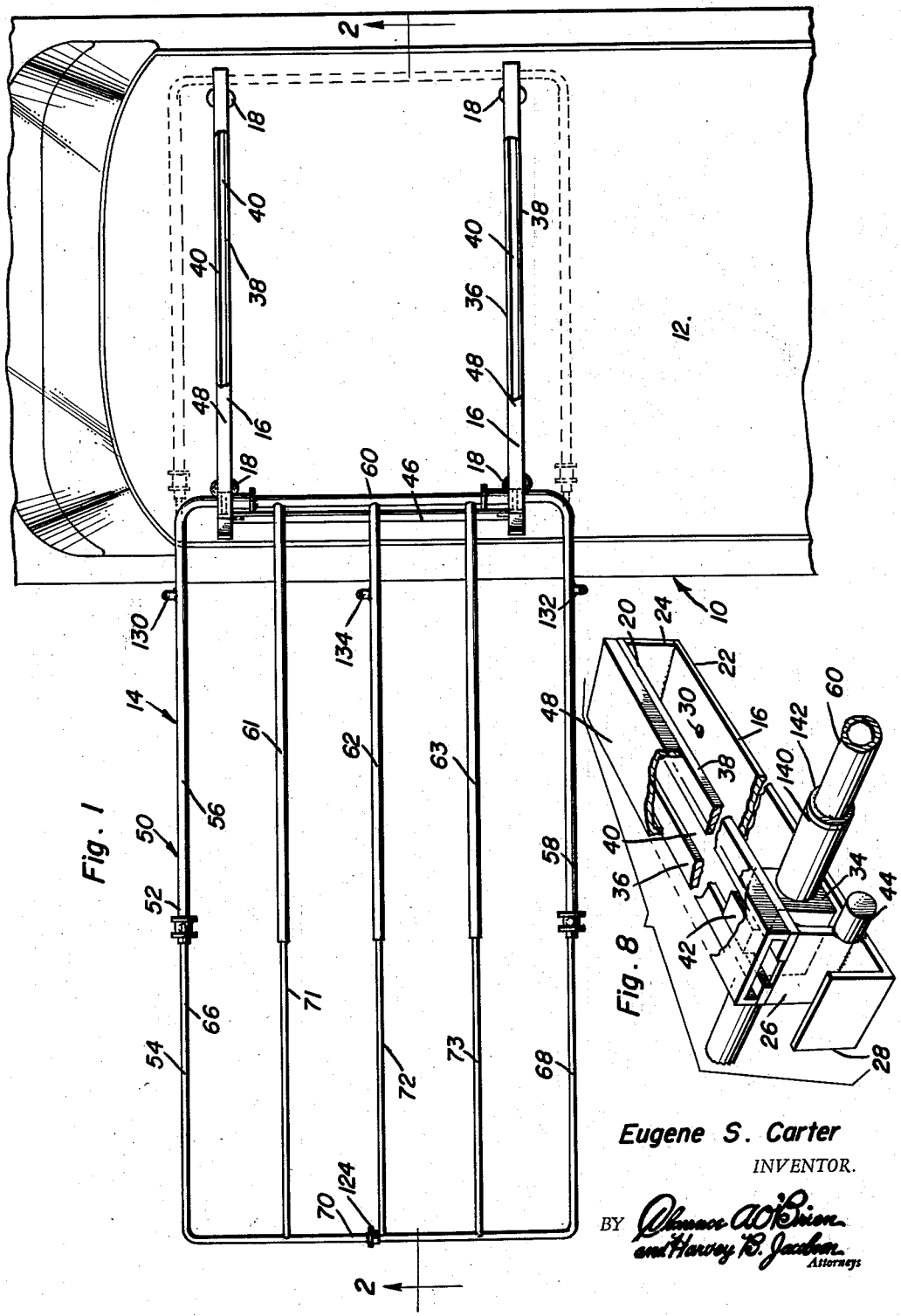

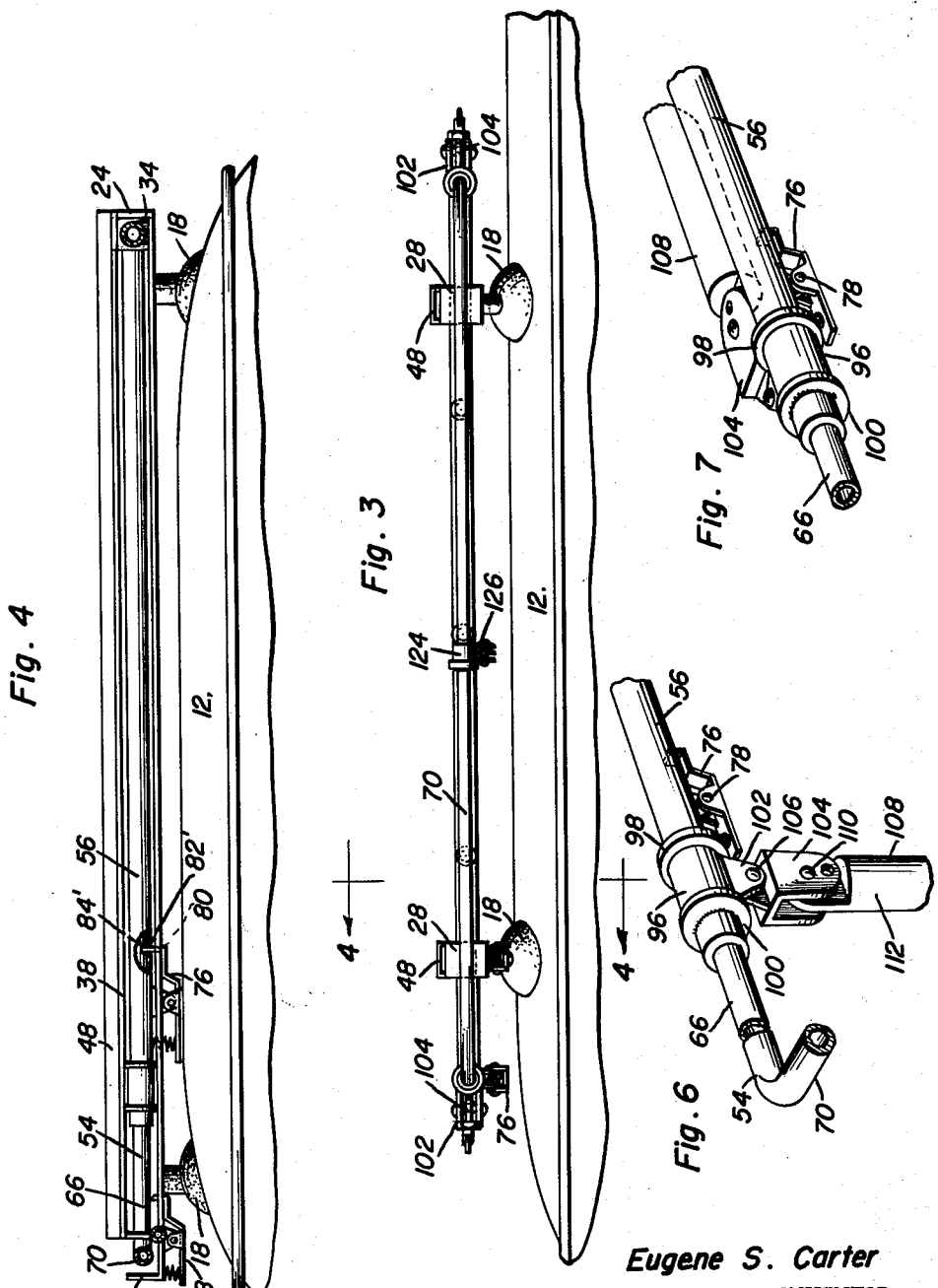

A United States Patent Office 3,192,937
Patented July 6, 1965

3,192,937
RETRACTIBLE VEHICLE CANOPY
Eugene S. Carter, Chico, Calif., assignor to himself and Dora Rosella Carter, Chico, Calif.
Filed July 11, 1963, Ser. No. 294,297
10 Claims. (Cl. 135—7.1)

This invention relates to a novel and useful retractible vehicle canopy and more specifically to a canopy structure including a supporting frame which is adapted to be secured to the top of a vehicle and which includes frame defining means that are extendable so as to define a roof frame projecting to one side of the vehicle to which the canopy assembly is secured. After the roof-defining frame has been erected, suitable cover means constructed of canvas or other suitable material may be disposed over the frame to form an enclosure alongside the vehicle to which the canopy assembly is secured.

The canopy includes a mounting portion adapted to be secured to a top of a vehicle which defines guide means to which the roof frame defining portion of the canopy is slidably secured for movement transversely of the vehicle. The roof frame defining portion of the canopy is constructed and secured to the mounting portion of the canopy in a manner which enables the mounting portion of the canopy to function as a rooftop carrier when the roof-defining frame of the canopy is in the retracted position. Further, the canopy assembly is constructed in a manner whereby the roof-defining frame thereof may be moved between extended and retracted positions while the mounting portion of the canopy is being utilized to support material from the top of the vehicle.

The main object of this invention is to provide a retractible vehicle canopy including means whereby a relatively large roof-forming frame may be defined alongside a vehicle to which the canopy assembly is secured. In this manner, a suitable cover constructed of canvas or the like may be utilized to form a tent immediately adjacent the vehicle and from which persons may enter the vehicle without first having to step out of the tent.

Another object of this invention, in accordance with the preceding object, is to provide a retractible vehicle canopy which will also function as a car top carrier and which may be utilized as a car top carrier while the roof frame of the canopy is disposed in either the extended or the retracted position and also during movement of the roof defining frame from one position to another.

Still another object of this invention is to provide a vehicle canopy constructed in a manner whereby it will be readily adapted for securement to substantially all types of hardtop vehicles.

A further object of this invention is to provide a retractible vehicle canopy including an extendable roof frame defining portion including depending and extendable leg means whereby the roof defining frame may be readily supported from irregular terrain alongside the vehicle to which the canopy is secured.

A final object of this invention to be specifically enumerated herein is to provide a retractible vehicle canopy which will conform to conventional forms of manufacture, be of simple construction and easy to erect so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top plan view of a conventional form of vehicle shown with the retractible vehicle canopy secured thereto and the roof frame defining portion thereof in an extended position;

FIGURE 2 is a rear elevational view of the assembly illustrated in FIGURE 1 with a tent-forming cover disposed over the roof frame defining portion of the canopy and portions of the cover being broken away and shown in section;

FIGURE 3 is a fragmentary longitudinal side elevational view of the vehicle shown with the extendable portion of the canopy in a retracted position;

FIGURE 4 is a fragmentary vertical sectional view taken substantially upon the plane indicated by the section line 4—4 of FIGURE 3;

FIGURE 5 is a fragmentary enlarged sectional view taken substantially upon a plane passing transversely through the center of the vehicle and with parts of the vehicle and canopy being broken away;

FIGURE 6 is a fragmentary enlarged perspective view of one portion of the extendable portion of the canopy showing the manner in which the extendable leg members are swingably and pivotally connected to the extendable portion of the canopy;

FIGURE 7 is an enlarged fragmentary perspective view of the embodiment illustrated in FIGURE 6 showing the position of the extendable leg member in the collapsed position; and FIGURE 8 is a fragmentary perspective view of a portion of the canopy showing the manner in which the extendable portion thereof is slidably secured to the mounting and car top carrier defining portion thereof, parts of the mounting portion and extendable portion of the canopy being broken away and shown in section.

Referring now more specifically to the drawings the numeral 10 generally designates a conventional form of station wagon-type vehicle which includes a top 12. The vehicle canopy of the instant invention is generally designated by the reference numeral 14 and includes a pair of elongated mounting guides 16 which are secured to the top 12 in any convenient manner and preferably by means of suction cups 18 as will be hereinafter more fully set forth.

The mounting guides 16 each include a pair of upper and lower plates 20 and 22 which are interconnected at corresponding end portions by means of upstanding webs 24 and 26. It will be noted from FIGURE 8 of the drawings that the plate 22 extends beyond the web 26 for a short distance and terminates in an upwardly directed retaining flange 28. The plates 22 are apertured as at 30 and fasteners 32 are secured through the apertures 30 and utilized to secure the suction cups 18 is depending relation to the opposite ends of each of the plates 22.

Each of the mounting guides 16 has a slide block 34 disposed between the upper and lower plates 20 and 22 and it may be seen from FIGURE 8 of the drawings that each of the upper plates 20 comprises a pair of generally parallel straps 36 and 38 between which a slot 40 is defined. Each of the slide blocks 34 includes a projection 42 which is slidably received in the corresponding slot 40 and the webs 24 and 26 define limits of sliding movement of the slide blocks 34 longitudinally of the mounting guides 16.

The mounting guides 16 are secured to the top 12 by means of the suction cups 18 in generally parallel and spaced relation as shown in FIGURE 1 of the drawing and each includes a laterally directed stub shaft 44 which is secured to the corresponding plate 22 and web 26. The stub shafts 44 project toward each other and are axially aligned and have the opposite ends of a spacing and abutment tube 46 telescoped thereover to insure the proper spacing between the corresponding ends of the mounting guides 16 and for another purpose which will be hereinafter more fully set forth.

The upper sides of the mounting guides 16 are covered by means of inverted channel-shaped covers 48 which are welded or otherwise secured to the upper surface of the strips or straps 36 and 38. It will be noted that the covers 48 define areas above the straps 36 and 38 in which the upper portions of the projections 42 which project above the straps 36 and 48 are received. Further, the covers 48 also provide a means for rigidly interconnecting the straps 36 and 38 between the webs 24 and 26.

The canopy 14 includes roof-forming frame member generally referred to by the reference numeral 50 comprising a first section 52 and an extendable section 54. The first section 52 comprises a tubular generally U-shaped member including a pair of leg portions 56 and 58 interconnected by means of a bight portion 60. The first section 52 further includes a plurality of supplemental leg members 61, 62 and 63 which generally parallel the leg members 56 and 58 and are secured to the bight portion 60 at corresponding ends. The extendable section 54 also defines a tubular U-shaped member that includes a pair of leg members 66 and 68 which are interconnected by means of a bight portion 70. Additionally, the extendable section 54 also includes a plurality of supplemental leg members 71, 72 and 73.

The leg members 66, 68, 71, 72 and 73 are each of a smaller diameter than the corresponding leg members 56, 58, 61, 62 and 63 and are telescopingly received in the ends of the leg members 56, 58, 61, 62 and 63 remote from the bight portion 60. The leg members 56 and 58 each include an apertured mount 74 to which a latch member 76 is pivotally secured by means of a pivot pin 78. Each of the latch members 76 includes an angulated end portion 80 which is receivable through a complementary opening 82 formed in the underside of the corresponding leg member and receivable in a complementary opening 84 formed in the corresponding leg member of the extendable section 54. These latch members 76 are yieldingly urged toward positions with the end portions 80 projecting through the corresponding openings 82 and 84 by means of compression springs 86 and are utilized to retain the extendable section 54 in its extended position against further extension and movement toward a retracted position. The end portions 80 are also receivable through the openings 82' and in the slots 84' formed in the leg members 56, 58 and 66, 68 to retain the section 54 fixed relative to the section 52 when the sections are in their retracted positions.

It may further be seen from FIGURE 5 of the drawings that each of the mounting guides 16 includes a bifurcated mount 87 to which a latch member 88 is pivotally secured and that each latch member 88 includes an angulated end portion 90 which is receivable through an opening 92 formed in the corresponding plate 22 for disposition behind the corresponding slide block 34 when the first section 52 is in the extended position to prevent movement of the first section toward the retracted position.

The outer end of each of the leg members 56 and 58 has a sleeve 96 rotatably journaled thereon between two abutment washers 98 and 100 which are secured to the corresponding leg member to prevent axial shifting of the sleeve 96. The sleeves 96 are each provided with bifurcated mounts 102 and each mount 102 has a second bifurcated mount 104 pivotally secured thereto by means of a pivot pin 106. The upper end of a supporting leg 108 is pivotally secured to each bifurcated mount 104 by means of a pivot pin 110 and each supporting leg 108 includes an upper tubular section 112 and a lower smaller diameter section 114 which is telescopingly received in the lower end of the upper section 112. Each upper section 112 is provided with a setscrew 116 engageable with the corresponding lower section 114 to secure the lower section 114 in adjusted extended position. The lower ends of the lower sections 114 are adapted to engage the ground 118 which supports the vehicle 10 and a cover assembly generally referred to by the reference numeral 120 is provided and may be draped over the roof-forming frame member 50 so as to form a tent or enclosure immediately adjacent the vehicle 10 and from which a person may enter the vehicle 10 without stepping out of the closure bound by the assembly cover 120. If it is desired, suitable windows 122 and means (not shown) for securing the cover assembly 120 to the roof-forming frame member 50 and the ground surface 118 may be provided.

The bight portion 70 is also provided with a sleeve 124 which is rotatably journaled thereon and has a bifurcated mount 126 to which the upper end of a supporting leg 128 similar to the supporting legs 108 is secured. The leg members 56, 58 and 62 are provided with U-shaped clips 130, 132 and 134 with which the free ends of the supporting legs 108 and 128 may be frictionally engaged to retain the supporting legs in the retracted positions illustrated in FIGURE 3 of the drawings. It will be noted that the supporting legs 108 and 128, when in the fully retracted positions, are disposed in a plane substantially coinciding with the medial plane of the roof-forming frame member 50 and that the medial plane of the roof-forming frame member 50 substantially coincides with the plane in which the mounting guides 16 are disposed. In this manner, it may be observed that the upper surfaces of the covers 48 define the uppermost points of the canopy 14 and that these upper surfaces may be utilized to support various types of loads.

With attention now directed to FIGURES 1 and 8 of the drawings it may be seen that the opposite ends of the bight portion 60 are rotatably received through the slide blocks 34 and that abutment sleeves 140 are carried by the slide blocks 34 and abut against stop washers 142 fixedly secured to the bight portion 60. In this manner, the bight portion 60 may not be shifted longitudinally relative to the mounting guides 16 and therefore the ends of the mounting guides 16 remote from the retaining flanges 26 are maintained in their proper spaced relation when the vehicle canopy 14 is removed from the vehicle top 12.

The tube 46 is disposed in a plane below the roof-forming frame member 50 and inasmuch as the first section 52 is pivotally secured to the slide blocks 34, it will be noted that the free end of the extendable section 54, the bight portion 70 which forms an anchor member when engaged in the upwardly opening channel defined by the flanges 28 for retaining the sections 52 and 54 in the retracted positions relative to each other and to said guides 16, may be swung upwardly so as to position the bight portion 70 above the retaining flange 28, thereby enabling the roof frame forming member 50 to be slid to the extended position shown in FIGURE 1 of the drawings relative to the guide mounts 16. However, the tube 46 may be utilized to support the extendable end of the roof-forming frame member 50 after it has been lifted over the retaining flange 28 and has been partially extended. Thereafter, the person extending the roof-forming frame member 50 may grasp the bight portion 70 adjacent the leg 128 and move the roof-forming frame member 50 to the fully extended position and then swing the leg 128 to its operative position. Thereafter, the legs 108 may be swung to the operative position. The usefulness of the tube 46, in addition to providing bracing between the corresponding ends of the mounting guide 16 may be greatly appreciated by a person extending the roof-forming frame member 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A retractible vehicle canopy including a plurality of elongated generally horizontal guide means adapted to be secured to a vehicle top and to extend transversely thereof, said guide means each defining a longitudinal horizontal transverse slot extending longitudinally thereof, roof-forming frame means including a longitudinal side member defining one marginal edge portion of said frame means extending transversely of said guide means and including portions slidably disposed in said slots for movement from one end of said guide means toward the other end of said guide means, and means carried by the opposite marginal portion of said frame means remote from said one marginal portion having the upper end portion of at least one depending supporting leg member secured thereto for support of said opposite marginal portion from the surface supporting said vehicle, said other end of said guide means including means defining an upwardly opening channel extending transversely thereof, slide means slidably disposed in said slots and pivotally secured to said one marginal edge portion for movement about an axis extending transversely of said guide means and laterally shiftable with said frame means during sliding movement of the latter relative to said guide means, said opposite marginal portion including anchor means extending transversely of said guide means and receivable in said channel when said frame means is in the retracted position.

2. A retractible vehicle canopy including a plurality of elongated generally horizontal guide means adapted to be secured to a vehicle top and to extend transversely thereof, said guide means each defining a longitudinal horizontal transverse slot extending longitudinally thereof, roof-forming frame means including a longitudinal side member defining one marginal edge portion of said frame means extending transversely of said guide means and including portions slidably disposed in said slots for movement from one end of said guide means toward the other end of said guide means, and means carried by the opposite marginal portion of said frame means remote from said one marginal portion having the upper end portion of at least one depending supporting leg member secured thereto for support of said opposite marginal portion from the surface supporting said vehicle, said guide means comprising a pair of elongated and generally parallel guide members, a pair of slides slidably engaged with said guides and disposed in said slots for movement therealong and to which said one marginal portion of said frame is pivotally secured for rotation about an axis extending transversely of said guide members and between said slides.

3. The combination of claim 2 wherein said guide members and slides include coacting latch means for releasably retaining said slides against movement away from said other end of said guide means thereby releasably retaining said frame means in the extended position.

4. The combination of claim 1 wherein said frame means is extendable to increase the distance between said one marginal portion and said opposite marginal portion.

5. The combination of claim 1 wherein said frame means includes a pair of relatively slidable sections slidably shiftable between almost fully overlapped retracted positions and extended positions in which the distance between said one marginal portion and said opposite marginal portion is substantially increased.

6. The combination of claim 2 wherein said guide means and said frame means include coacting latch means releasably engageable with each other for retaining said frame means in an extended position relative to said guide means.

7. The combination of claim 6 wherein said frame means includes a pair of relatively slidable sections slidably shiftable between almost fully overlapped retracted positions and extended positions in which the distance between said one marginal portion and said opposite marginal portion is substantially increased.

8. The combination of claim 7 wherein said relatively slidable sections include coacting latch means releasably engageable with each other for retaining said sections in extended positions relative to each other.

9. The combination of claim 2 including a plurality of depending extendable leg members swingably secured at their upper ends to the last-mentioned means for rotation about axes generally paralleling the medial plane of said frame means and extending transversely of said guide means.

10. The combination of claim 9 wherein said last-mentioned means are supported from said frame means for rotation about axes generally paralleling the medial plane of said frame means and extending longitudinally of said guide means.

References Cited by the Examiner

UNITED STATES PATENTS

| | | | |
|---|---|---|---|
| 1,752,571 | 4/30 | Olson | 135—4 |
| 2,825,351 | 3/58 | Thornton | 135—1 |
| 2,870,774 | 1/59 | Blosser | 135—7.1 |
| 2,938,525 | 5/60 | MacKinlay | 135—4 |

CHARLES E. O'CONNELL, *Primary Examiner.*

HARRISON R. MOSELEY, *Examiner.*